Patented Jan. 8, 1952

2,581,814

UNITED STATES PATENT OFFICE 2,581,814

PREPARATION OF GLUTAMYL HISTIDINE

Albert A. Plentl, New York, N. Y., assignor to Ralph L. Evans, Bay Shore, N. Y.

No Drawing. Application October 4, 1947, Serial No. 778,033

4 Claims. (Cl. 260—112)

The present invention relates to starting nuclei for the preparation of polypeptide chains and in particular to new and useful dipeptides resulting from the linking of glutamic acid, and histidine.

Objects and advantages of the invention will be set forth in part hereinafter and in part will be obvious herefrom, or may be learned by practice with the invention, the same being realized and attained by means of the steps, compositions, combinations and improvements pointed out in the appended claims.

The invention consists in the novel steps, compositions, combinations and improvements herein described.

Dipeptides from glutamic acid and histidine are important and useful intermediates for the preparation of many valuable physiologically active compounds. Because of the particular importance of these two amino acids, as is determined from their occurrence in living tissue, such dipeptides will be extremely advantageous in the study of polypeptides and proteins and in the controlled synthesis of polypeptides, proteins, and fragments of each.

It is an object of the present invention to provide dipeptides from glutamic acid and histidine, both in the free form, and in forms where one or more of the reactive groups of each which are not in peptide linkage are blocked with easily removable radicals.

An example of one embodiment of the present invention, in which a glutamyl histidine is prepared, is as follows:

Dissolve 10 g. histidine methyl ester dihydrochloride in 125 cc. absolute methyl alcohol by warming the flask, preferably a 500 cc. wide mouth Erlenmeyer, in warm water. Histidine methyl ester must be prepared immediately before use. Prolonged standing at room temperature results in its decomposition and/or condensation to its anhydride. Meanwhile prepare a solution of 4.4 g. sodium methylate in 90 ml. absolute methyl alcohol and add it all at once to the rapidly chilled solution of histidine methyl ester dihydrochloride. Only a small amount of finely divided sodium chloride precipitates at this point. Allow this mixture to stand for 30 minutes and then add 100 cc. of absolute ether. Shake the mixture well in order to coagulate the precipitate and then filter through a dry Pyrex "M" funnel directly into a 1000 cc. gg. round bottom flask. The filtrate which must be clear at this point, is concentrated under reduced pressure at temperatures not exceeding 40° C. and under exclusion of moisture. The residue consisting of a mixture of histidine methyl ester and sodium chloride is suspended in 25 cc. chloroform, the sodium chloride filtered off and the filtrate concentrated. About 4.8 g. NaCl are usually obtained. The residue is once more suspended in chloroform, sodium chloride is filtered off in a Pyrex "M" or "F" funnel, and the clear filtrate which is usually slightly colored is used for the following condensation.

The chloroform solution of histidine methyl ester is cooled in ice. It is tested with wet universal indicator paper to make sure its pH is about 8.0 or above. Small portions of carbobenzoxyglutamic acid anhydride are added until the pH of the solution has dropped to about 6.0 (bright yellow). About a knife point is added at a time and the mixture is slowly shaken until the anhydride has gone into solution. All the anhydride must be dissolved before adding any more. About 3 or 4 g. of the anhydride will be used up.

The chloroform solution is allowed to stand for 12 to 24 hours at room temperature. During standing the solution becomes cloudy, precipitating the product. 100 cc. of cooled petroleum ether is added to the chloroform solution which precipitates the product in granular or oily form. If the precipitate is granular it is filtered off and washed well with petroleum ether. If the precipitate retains $CHCl_3$ it will be too hygroscopic to filter. If the precipitate is oily it will stick to the sides of the flask. The supernatant is decanted and the residual oil is washed with petroleum ether.

The dry powder, or oil, is dissolved in 75.00 cc. of 0.5 N NaOH and the solution allowed to stand at room temperature for 4 hours. Normality and quantity must be accurately known. The exact equivalent of 0.5 N HCl is now added and the solution taken to dryness under reduced pressure. The residue, consisting of salt and carbobenzoxy-glutamyl-histidine is thoroughly extracted with methyl alcohol at room temperature. The product dissolved in the alcohol, leaving sodium chloride in granular easily filterable form. The salt is removed by filtration through a Pyrex "M" funnel and the filtrate is taken to dryness.

50 to 100 cc. methyl alcohol are added to the residue and the precipitate is suspended as well as possible. Any residual salt is removed by filtration and the filtrate is collected in a 1000 cc. ground glass flask. The methyl alcohol solution is taken to dryness, the residue suspended in 400 cc. absolute ethanol and the mixture refluxed for 30 minutes. It is then filtered while hot through folded filter paper and the filtrate cooled and allowed to stand in the ice box over night. The filtrate is collected by centrifugation in a 50 cc. centrifuge tube and the clear supernatant discarded. The precipitate is washed with 30 cc. ether-alcohol mixture and finally with ether. The dry product is placed in a $P_2O_5$ desiccator without vacuum.

The yield is 2.0 to 2.5 g.

The compound does not have a characteristic melting point; it softens at 115° and begins to decompose at 125° with strong foaming, but without discoloration.

2.00 g. of the carbobenzoxy-glutamyl histidine are placed into a dry 125 cc. Pyrex centrifuge tube together with 0.75 to 1.0 g. of active palladium black. Upon addition of 75 cc. of water the organic material dissolves leaving the catalyst in suspension. A gas inlet tube is now inserted and the air replaced by a fast stream of nitrogen (10 to 15 minutes). The nitrogen is then replaced by hydrogen which is blown through the solution at a sufficiently fast rate to keep the catalyst in suspension.

Every 20 minutes the effluent gases are led into a test tube containing about 5.00 cc. $Ba(OH)_2$. The reaction is complete in about 3 hours if the $Ba(OH)_2$ solution stays clear after 5 minutes of such treatment.

The hydrogen is now replaced by nitrogen as described above, the flask disconnected and the catalyst collected by filtration through A Pyrex "C" filter. The water solution should be tested with $AgNO_3$ for the presence of chloride ion. If this is positive $Cl^-$ should be removed with $Ag_2SO_4$. The filtrate is taken to dryness under reduced pressure, leaving a residue of about 1.35 g.

The product glutamyl histidine should be recrystallized from dilute ethyl alcohol.

The glutamic acid portion of the molecule, depending upon the position of the blocking group, may be alpha- or gamma-glutamic acid.

Alternatively, by selective blocking of the amino acid groups, histidinyl glutamic acid may be formed by varying the foregoing process accordingly.

The invention in its broader aspects is not limited to the specific steps, compositions, combinations and improvements described but departures may be made therefrom within the scope of the accompanying claims without departing from the principles of the invention and without sacrificing its chief advantages.

What is claimed is:
1. Glutamyl histidine.
2. Carboaralkoxy glutamyl histidine ester.
3. Carboaralkoxy glutamyl histidine.
4. The process of preparing glutamyl histidine comprising reacting a histidine ester with a carboaralkoxy glutamic acid anhydride to obtain carboaralkoxy glutamyl histidine ester, saponifying and acidifying the reaction product to obtain a carboaralkoxy glutamyl histidine and reducing said compound to obtain glutamyl histidine.

ALBERT A. PLENTL.

REFERENCES CITED

The following references are of record in the file of this patent:

Chemical Abstract, vol. 32, page 7974 citing Du Vigneaud et al., J. Biol. Chem., vol. 125, pp. 269–274 (1938).

Migliardi: Arch. Science Biol., vol. 27, pp. 327–332 (1941).

"Advances in Protein Chemistry," vol. V, page 42 (1949).